United States Patent
Borella et al.

(10) Patent No.: US 7,171,492 B1
(45) Date of Patent: Jan. 30, 2007

(54) METHOD AND APPLICATION PROGRAMMING INTERFACE FOR ASSIGNING MULTIPLE NETWORK ADDRESSES

(75) Inventors: Michael S. Borella, Naperville, IL (US); Nurettin B. Beser, Evanston, IL (US)

(73) Assignee: UTStarcom, Inc., Rolling Meadows, IL (US)

( * ) Notice: Subject to any disclaimer, the term of this patent is extended or adjusted under 35 U.S.C. 154(b) by 0 days.

(21) Appl. No.: 09/511,735

(22) Filed: Feb. 24, 2000

(51) Int. Cl.
*G06F 15/16* (2006.01)
(52) U.S. Cl. ...................................... 709/245
(58) Field of Classification Search ............... 709/227, 709/226, 245; 719/328, 330, 331
See application file for complete search history.

(56) References Cited

U.S. PATENT DOCUMENTS

| | | | |
|---|---|---|---|
| 4,953,198 A | 8/1990 | Daly et al. ..................... 379/61 |
| 5,159,592 A | 10/1992 | Perkins ....................... 370/85.7 |
| 5,227,778 A | 7/1993 | Vacon et al. ........... 340/825.52 |
| 5,327,365 A | 7/1994 | Fujisaki et al. ............. 364/717 |
| 5,497,339 A | 3/1996 | Bernard .................... 364/705.5 |
| 5,526,353 A | 6/1996 | Henley et al. ............. 370/60.1 |
| 5,526,489 A | 6/1996 | Nilakantan et al. .... 395/200.02 |
| 5,550,984 A | 8/1996 | Gelb ...................... 395/200.17 |
| 5,604,737 A | 2/1997 | Iwami et al. ................ 370/352 |
| 5,606,594 A | 2/1997 | Register et al. ............... 379/58 |
| 5,619,650 A * | 4/1997 | Bach et al. .................. 709/246 |
| 5,625,678 A * | 4/1997 | Blomfield-Brown ..... 379/93.08 |
| 5,636,216 A * | 6/1997 | Fox et al. .................... 370/402 |
| 5,654,957 A | 8/1997 | Koyama ..................... 370/355 |
| 5,674,003 A * | 10/1997 | Andersen et al. ........... 709/228 |
| 5,708,655 A * | 1/1998 | Toth et al. .................. 370/313 |
| 5,737,333 A | 4/1998 | Civanlar et al. ............. 370/352 |
| 5,742,596 A | 4/1998 | Baratz et al. ................ 370/356 |
| 5,754,547 A | 5/1998 | Nakazawa ................... 370/401 |
| 5,793,657 A | 8/1998 | Nemoto .................. 364/717.01 |
| 5,793,763 A | 8/1998 | Mayes et al. ................ 370/389 |
| 5,812,819 A | 9/1998 | Rodwin et al. ............. 395/500 |
| 5,835,723 A | 11/1998 | Andrews et al. ....... 395/200.56 |

(Continued)

FOREIGN PATENT DOCUMENTS

WO      WO 01/31888 A1     5/2001

OTHER PUBLICATIONS

"Internet Engineering Task Force", Request for Comments 768, User Datagram Protocol, Aug. 1980, pp. 1-3.

(Continued)

*Primary Examiner*—William Vaughn
*Assistant Examiner*—Greg Bengzon
(74) *Attorney, Agent, or Firm*—McDonnell Boehnen Hulbert & Berghoff LLP

(57) ABSTRACT

A method and application programming interface for using multiple network addresses on a common physical layer. The host protocol stack supports multiple Internet Protocol interfaces. When a process makes a function call to create a new socket, a new IP address is associated with the socket. Each socket is then bound to an IP address that is distinct from the IP addresses bound to other sockets. This is in contrast to conventional sockets that are bound to a common IP address. In this manner, each process may be associated with a unique IP address. Such a configuration may useful in Internet telephony where each call process receives a unique private IP address in a virtual private network.

8 Claims, 5 Drawing Sheets

U.S. PATENT DOCUMENTS

| | | | |
|---|---|---|---|
| 5,862,331 A | 1/1999 | Herriot | 395/200.49 |
| 5,867,495 A | 2/1999 | Elliott et al. | 370/352 |
| 5,867,660 A | 2/1999 | Schmidt et al. | 395/200.57 |
| 5,872,847 A | 2/1999 | Boyle et al. | 380/25 |
| 5,889,774 A | 3/1999 | Mirashrafi et al. | 370/352 |
| 5,892,924 A | 4/1999 | Lyon et al. | 395/200.75 |
| 5,915,008 A | 6/1999 | Dulman | 379/201 |
| 5,933,778 A | 8/1999 | Buhrmann et al. | 455/461 |
| 5,950,195 A | 9/1999 | Stockwell et al. | 707/4 |
| 5,987,517 A * | 11/1999 | Firth et al. | 709/230 |
| 6,011,782 A | 1/2000 | DeSimone et al. | 370/260 |
| 6,055,236 A | 4/2000 | Nessett et al. | 370/389 |
| 6,055,561 A | 4/2000 | Feldman et al. | 709/200 |
| 6,055,574 A * | 4/2000 | Smorodinsky et al. | 709/226 |
| 6,058,421 A | 5/2000 | Fijolek et al. | 709/225 |
| 6,061,349 A * | 5/2000 | Coile et al. | 370/389 |
| 6,079,021 A | 6/2000 | Abadi et al. | 713/202 |
| 6,101,189 A | 8/2000 | Tsuruoka | 370/401 |
| 6,101,543 A | 8/2000 | Alden et al. | 709/229 |
| 6,104,711 A | 8/2000 | Voit | 370/352 |
| 6,115,751 A | 9/2000 | Tam et al. | 709/240 |
| 6,134,591 A | 10/2000 | Nickles | 709/229 |
| 6,137,791 A | 10/2000 | Frid et al. | 370/352 |
| 6,157,950 A * | 12/2000 | Krishnan | 709/223 |
| 6,172,986 B1 | 1/2001 | Watanuki et al. | 370/466 |
| 6,182,146 B1 * | 1/2001 | Graham-Cumming, Jr. | 709/238 |
| 6,185,184 B1 * | 2/2001 | Mattaway et al. | 370/230 |
| 6,195,705 B1 | 2/2001 | Leung | 709/245 |
| 6,212,183 B1 | 4/2001 | Wilford | 370/392 |
| 6,212,563 B1 | 4/2001 | Beser | 709/227 |
| 6,219,707 B1 * | 4/2001 | Gooderum et al. | 709/225 |
| 6,247,057 B1 * | 6/2001 | Barrera, III | 709/229 |
| 6,249,820 B1 | 6/2001 | Dobbins et al. | 709/238 |
| 6,266,701 B1 * | 7/2001 | Sridhar et al. | 709/232 |
| 6,266,707 B1 | 7/2001 | Boden et al. | 709/245 |
| 6,269,099 B1 | 7/2001 | Borella et al. | 370/389 |
| 6,272,523 B1 * | 8/2001 | Factor | 709/201 |
| 6,298,063 B1 * | 10/2001 | Coile et al. | 370/401 |
| 6,321,267 B1 * | 11/2001 | Donaldson | 709/229 |
| 6,324,582 B1 * | 11/2001 | Sridhar et al. | 709/230 |
| 6,353,614 B1 | 3/2002 | Borella et al. | 370/389 |
| 6,353,891 B1 | 3/2002 | Borella et al. | 713/201 |
| 6,366,958 B1 * | 4/2002 | Ainsworth et al. | 709/230 |
| 6,377,987 B1 * | 4/2002 | Kracht | 709/220 |
| 6,381,646 B2 * | 4/2002 | Zhang et al. | 709/227 |
| 6,434,620 B1 * | 8/2002 | Boucher et al. | 709/230 |
| 6,445,704 B1 * | 9/2002 | Howes et al. | 370/392 |
| 6,470,389 B1 * | 10/2002 | Chung et al. | 709/227 |
| 6,516,345 B1 * | 2/2003 | Kracht | 709/220 |
| 6,891,837 B1 * | 5/2005 | Hipp et al. | 370/397 |
| 7,020,700 B1 * | 3/2006 | Bennett et al. | 709/224 |
| 2001/0047421 A1 * | 11/2001 | Sridhar et al. | 709/230 |

OTHER PUBLICATIONS

"Internet Engineering Task Force", Request for Comments 791, Internet Protocol, Sep. 1981, pp. i-45.

"Internet Engineering Task Force", Request for Comments 792, Internet Control Message Protocol, Sep. 1981, pp. 1 to 21.

"Internet Engineering Task Force", Request for Comments 793, Transmission Control Protocol, Sep. 1981, pp. i to 85.

"Internet Engineering Task Force", Request for Comments 959, File Transfer Protocol (FTP), Oct. 1985, pp. 1 to 69.

"Internet Engineering Task Force", Request for Comments 1323, TCP Extensions for High Performance, May 1992, pp. 1 to 37.

"Internet Engineering Task Force", Request for Comments 1631, The IP Network Address Translator (NAT), May 1994, pp. 1 to 10.

"Internet Engineering Task Force", Request for Comments 2131, Dynamic Host Configuration Protocol, Mar. 1997, pp. 1 to 45.

"Internet Engineering Task Force", Request for Comments 2292, Advanced Sockets API for Ipv6, Feb. 1998, pp. 1 to 67.

"Internet Engineering Task Force", Request for Comments 2553, Basic Socket Interface Extensions for Ipv6, Mar. 1999, pp. 1 to 41.

"Internet Engineering Task Force", Request for Comments 2663, IP Network Address Translator (NAT) Terminology and Considerations, Aug. 1999, pp. 1 to 30.

"ITU-T Recommendation H.323", Series H: Audiovisual and Multimedia Systems (Systems and Terminal Equipment for audiovisual Services), Telecommunication Standardization Sector of ITU, International Telecommunciation Union, Feb. 1998, 125 pages.

Maurice J. Back, The Design of the Unix operating System, Prentice Hall Software Series, 1986, pp. 382 to 390.

"Cisco IOS Release 12.0 Network Protocols Configuraton Guide, Part 1", Configuring IP Addressing, Cisco Systems, 1998, pp. P1C-7 to P1C-58.

G. Montene, Internet Engineering Task Force, Internet Draft, "Negotiated Address Reuse" (NAR), <draft-montenegro-aatn-nar-00.txt>, May 1998, pp. 1 to 22.

George Tsirtsis, Alan O'Neill, Internet Engineering Task Force, Internet Draft, "NAT Bypass for End 3 End 'Sensitive' Applications," ,<draft-tsirtsis-nat-bypass-00.txt>, Jan. 1998, pp. 1 to 5.

George Tsirtsis, Pyda Srishuresh, Internet Engineering Task Force, Internet Draft, "Network Address Translation—Protocol Translation" (NAT-PT), <draft-ietf-ngtrans-natpt-04.txt>, Jan. 1999, pp. 1 to 13.

Jeffrey Lo, K. Taniguchi, Internet Engineering Task force, Internet Draft, "IP Host Network Address (and port) Translation," <draft-ietf-nat-hnat-00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation,"<draft-borella-aatn-dnat-01.txt>, Oct. 1998, pp. 1 to 21.

P. Srisuresh, G. Tsirtsis, P. Akkiraju, A. Heffernan, Internet Engineering Task Force, Internet Draft, "DNS Extensions to Network Address Translators," (DNS_ALG), <draft-ietf-nat-dns-alg-01.txt>, Oct. 1998, pp. 1 to 24.

P. Srisuresh, Internet Engineering Task Force, Internet Draft "Security for IP Network Address Translator (NAT) Domains," <draft-ietf-nat-security-00.txt.>, Nov. 1998, pp. 1 to 11.

P. Srisuresh, K. Eg, Internet Engineering Task Force, Internet Draft, "The IP Network Address Translator"(NAT), <draft-rfced-info-srisuresh-05.txt>, Feb. 1998, pp. 1 to 24.

P. Srisuresh, K. Egev, Internet Engineering Task Force, Internet Draft, "Traditional IP Network Address Translator (Traditional NAT)," <draft-ietf-nat-traditional-01.txt>, Oct. 1998, pp. 1 to 17.

P. Srisuresh, Matt Holdrege, Internet Engineering Task Force, Internet Draft, "IP Netowrk Address Translator (NAT) Terminology and Considerations," <draft-ietf-nat-terminology-01.txt>, Oct. 1998, pp. 1 to 28.

Praveen Akkiraju, Yakov Rekhter, Internet Engineering Task Force, Internet Draft, "A Multihoming Solution Using NATs" <draft-akkiraju-nat-multihoming-00.txt>, Nov. 1998, pp. 1 to 32.

R. G. Moskowitz, Internet Engineering Task Force, Internet Draft, "Network Address Translation Issues with IPsec," <draft-moskowitz-net66-vpn-00.txt>, Feb. 6, 1998, p. 1 to 8.

R. Thay, N. Doraswa and R. Gle, Internet Engineering Task Force, Internet Draft "IP Security," <draft-ietf-ipsec-doc-roadmap-02.txt>, Nov. 1997, pp. 1 to 12.

T. Hain, Internet Engineering Task Force, Internet Draft, "Architectural Implications of NAT," <draft-iab-nat-implications-02.txt>, Oct. 1998, pp. 1 to 14.

W.T. Teo, S.W. Yeow, R. Singh, Internet Engineering Task Force, Internet Draft, "IP Relocations Through Twice Network Address Translators," <draft-ietf-nat-rnat-00.txt>, Feb. 1999, pp. 1 to 20.

W.T. Teo, S.W. Yeow, R. Singh, Internet Engineering Task Force, Internet Draft, "Reverse Twice Netowrk Address Translators" (RAT), "<draft-teoyeow-mip-rat-01.txt>," Dec. 1998, pp. 1 to 20.

W.T. Teo, Y. Li, Internet Engineering Task Force, Internet Draft, "Mobile IP Extension for Private Internets Support," <draft-teoyli-mobileip-mxpn-02.txt>, Feb. 1999. pp. 1 to 24.

Yakov Rekhter, Internet Engineering Task Force, Internet Draft, "Implications of NATs on the TCP/IP Architecture," <draft-ietf-nat-arch-implications-00.txt>, Feb. 1999, pp. 1 to 7.

K. Egevang, and P. Francis, Internet Engineering Task Force ("IETF"), Request for Comments ("RFC") RFC-1631, "The IP Network Address Translator (NAT)", May 1994, pp. 1-10.

Borella, Michael, *Technology Update—Protocol Helps Stretch IPv4 Addresses*, "Network World", vol. 17, No. 3, Jan. 17, 2000, p. 43.

Kent, Stephen, *Evaluating Certification Authority Security*, Aerospace Conference, 1998 IEEE, Online, vol. 4, pp. 319-327 (Mar. 21-23, 1998).

Thayer, Rodney, *Bulletproof IP With Authentication and Encryption IPSec Adds a Layer of Armor to IP*, Data Communications, vol. 26, No. 16, pp. 55-58, 60 (Nov. 21, 1997).

Borella, M., Grabelsky, D., Lo, J., Tuniguchi, K., Internet Engineering Task Force, Internet Draft, "Realm Specific IP: Protocol Specification <draft-ietf-nat-rsip-protocol-.06.txt>", Mar. 2000, pp. 1-48.

Borella, M., Grabelsky, D., Lo, J., Tuniguchi, K., Internet Engineering Task Force, Internet Draft, "Realm Specific IP: Protocol Specification <draft-ietf-nat-rsip-protocol-.07.txt", Jul. 2000, pp. 1-49.

Montenegro, G., Internet Engineering Task Force, Internet Draft, "RSIP Support for End-to-End IPsec," <draft-ietf-nat-rsip-ipsec-04.txt>, Jul. 2000, pp. 1-17.

Borella, M., Lo, J., Grabelsky, D., Montenegro, G., Internet Engineering Task Force, Internet Draft, "Realm Specific IP: Framework <draft-ietf-nat-rsip-framework-.05.txt>", Jul. 2000, pp. 1-30.

Borella, M., Montenegro, G., *RSIP: Address Sharing with End-To-End Security*, USENIX Conference, San Francisco, California, Mar. 9, 2000, pp. 1-9.

Handley, M., et al. *SIP: Session Initiation Protocol*, Network Working Group, Request for Comments 2543, Mar. 1999, pp. 1 to 153.

ITU-T Recommendation H.225.0, *Call Signaling Protocls and Media Stream Packetization for Packet-Based Multimedia Communication Systems*, Series H: Audiovisual and Multimedia Systems—Infrastructure of Audiovisual Services—Transmission Multiplexing and Synchronization, (Feb. 1998).

McCanne et al., "The BSD Packet Filter: A New Architecture for User-Level Packet Capture," Proceedings of the 1993 Winter USENIX Technical Conference (Jan. 1993).

Durand, Alain, *Deploying Ipv6*, IEEE Internet Computing, http://computer.org/internet, Jan.-Feb. 2001, pp. 79-81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gariulo, Robert, Collaboration Using Multiple PDAs Connected to a PC, Proceedings of ACM 1998 conference on Computer supported cooperative work, Nov. 14-18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP-Based IP Telephony System, *IEEE Communications Magazine*, vol. 37, No. 7, Jul. 1999, pp. 96-101. (8 total pages).

Handley/Schulzrinne/Schooler/Rosenberg, SIP: Session Initiation Protocol, Internet Engineering Task Force, draft-ietf-sip-rfc2543bis-02.ps. Sep. 4, 2000. (131 pages).

Borella, M., Lo, J., Grabelsky, D., Montenegro, G., IETF Proceedings presentation, "Realm Specific IP: Protocol Specification <draft-nat-rsip-protocol-00.txt>", Apr. 1999 (13 pages).

Marsan, Carlyn Duffy, The Next Best Things to Ipv6? Network World Fusion at http://www.nbwfusion.com/news/1999/0920ipv6.html, Mar. 29, 2000, pp. 1-3.

Borella, M., Lo, J., Grabelsky, D., Montenegro, G., Internet Engineering Task Force, Internet Draft, "Realm Specific IP: Framework <draft-ietf-nat-rsip-framework-.04.txt>", Mar. 2000, pp. 1-30.

IETF Mar. 1999 Proceedings, 2.7.10 Network Address Translators (nat), pp. 1-13.

Rosenberg, Jonathan D. and Shockey, Richard, The Session Initiation Protocol (SIP): A Key Component for Internet Telephony, ComputerTelephony.com, Jun. 2000, pp. 124-139.

Fenner, W., *Internet Group Management Protocol Version 2*, RFC 2236, Nov. 1997, pp. 1-24.

Mogul, J. et al., "*Internet Standard Subnetting Procedure*", RFC 950, Aug. 1985, pp. 1-18.

Schulzrinne et al., "*RTP: A Transport Protocol for Real-Time Applications*", RFC 1889, pp. 1-75.

Privat, Jermone, "*Double Phase DHCP Configuration*", <draft-privat-dhc-doublephase-01.txt>, Internet Engineering Task Force, Sep. 1999, pp. 1-4.

Maughan, D. et al., "*Internet Security Assocation and Key Management Protocol*", RFC 2408, Nov. 1998, pp. 1-86.

Karn, P., "*Photuris Session-Key Management Protocol*", RFC 2522, Mar. 1999, pp. 1-58.

"*Random Number Generators*", Computational Science Education Project, 1991, 1992, 19993, 1994 and 1995.

Foster, Ian, "*10 Random Numbers*", 1995.

Borella, Michael et al., "*Realm Specific IP: Protocol Specification*", <draft-ietf-nat-rsip-protocol-02.txt>, Internet Draft, Aug. 1999, pp. 1-27.

Gilligan, R. et al., "*Transition Mechanisms for IPv6 Hosts and Routers*", RFC 1933, Apr. 1996, pp. 1-22.

Afifi, H. et al., "*Method for IPv4-IPv6 Transition*", Proceedings IEEE International Symposium on Computers and Communications, Jul. 6-8, 1999, pp. 478-484.

* cited by examiner

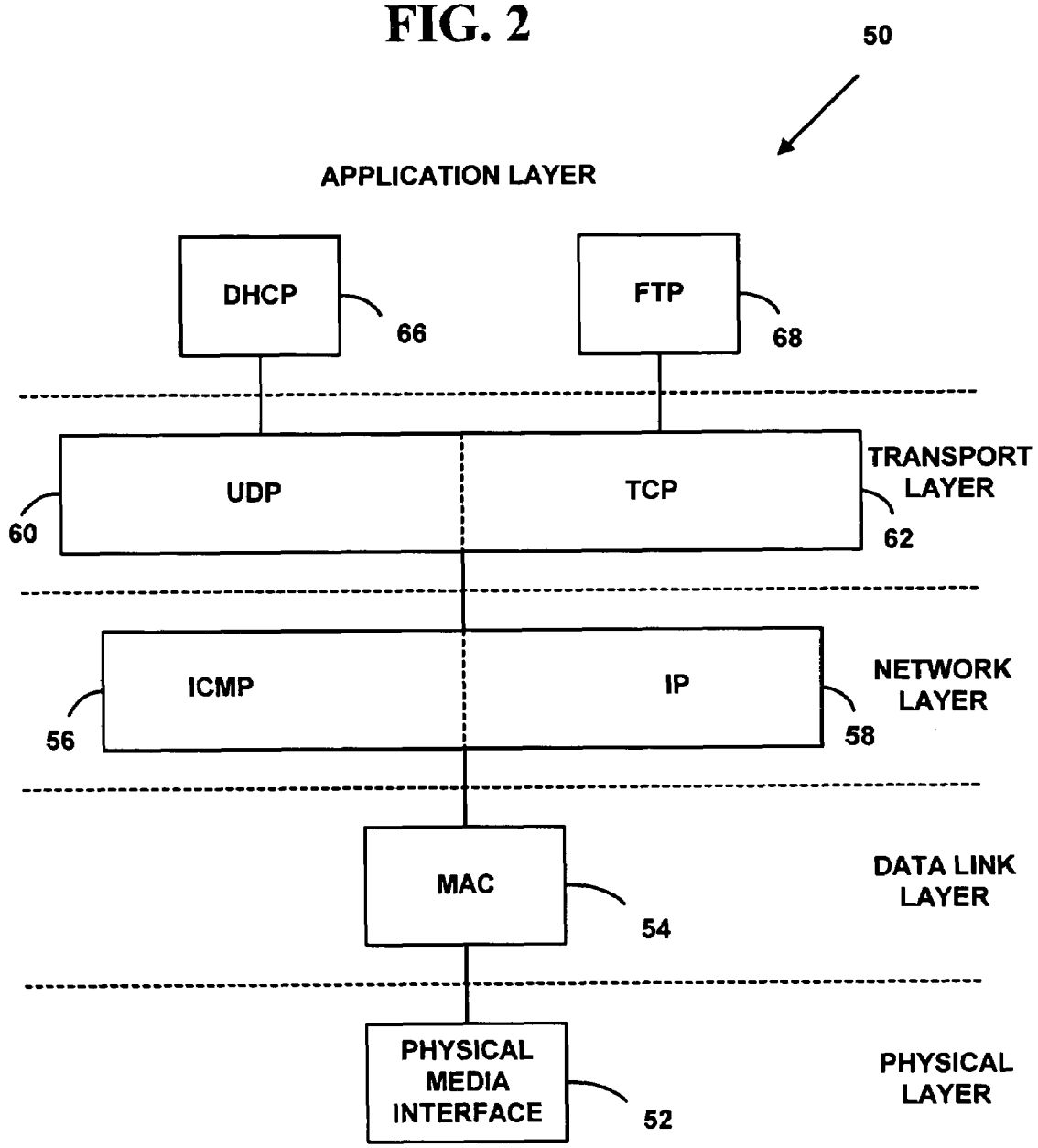

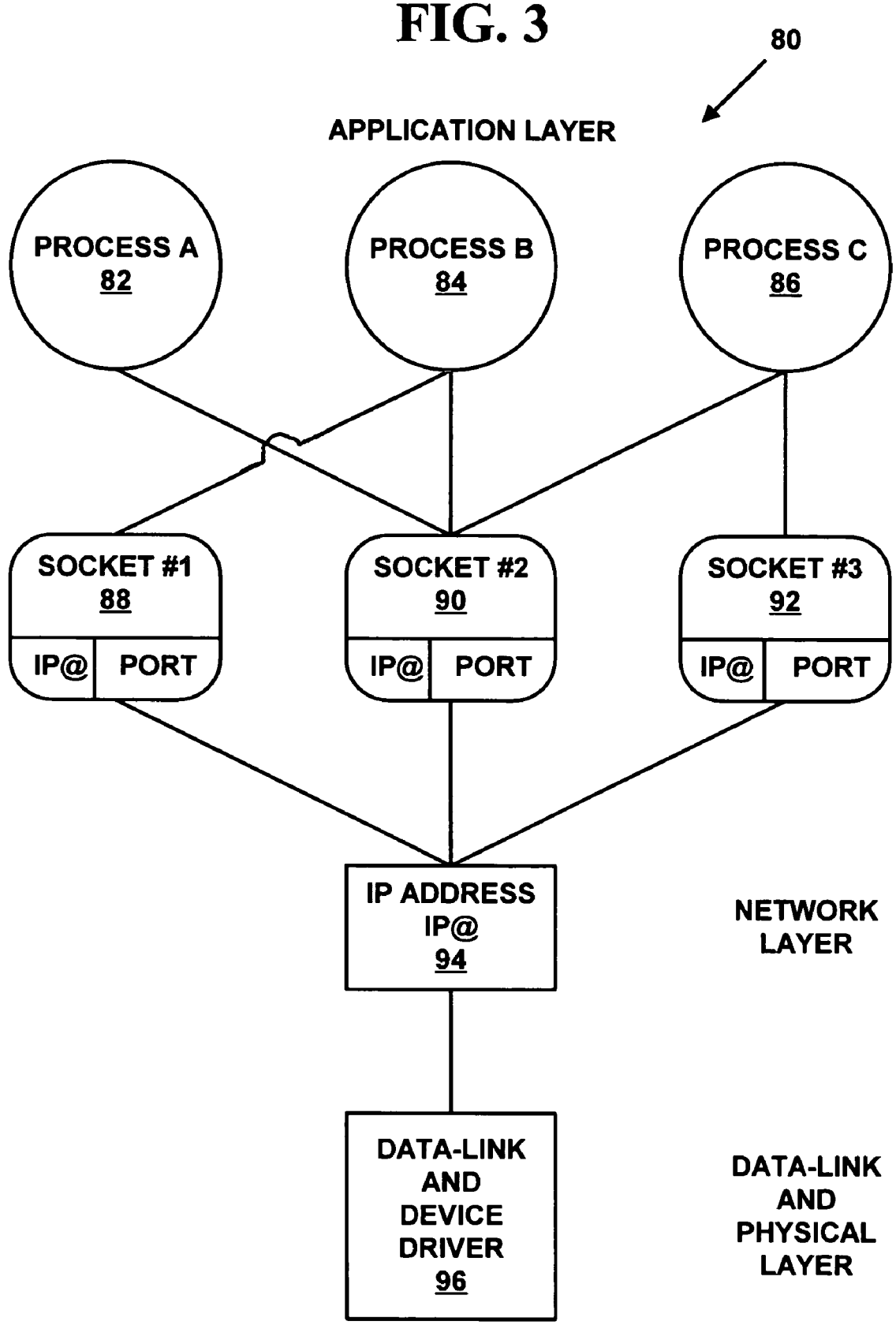

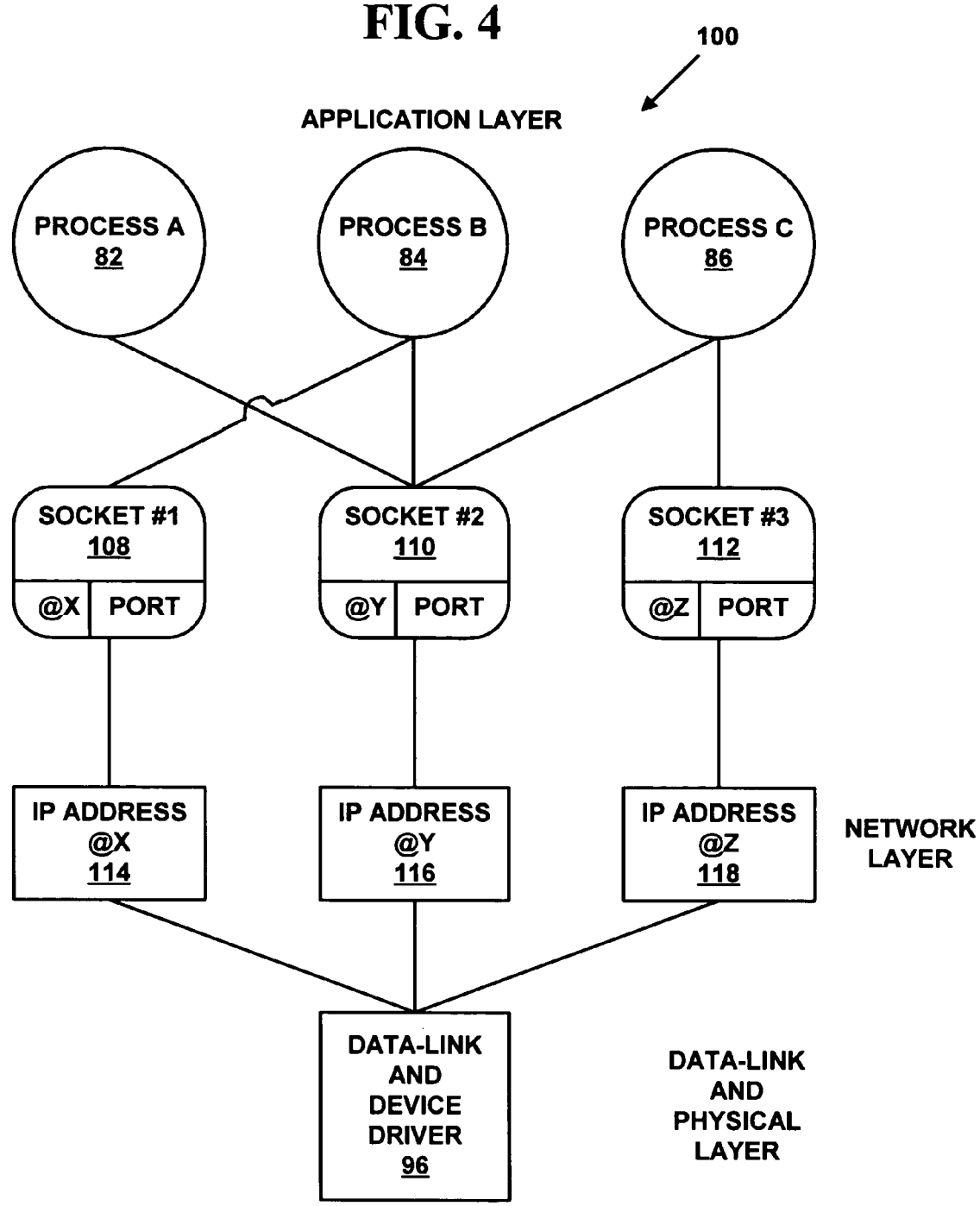

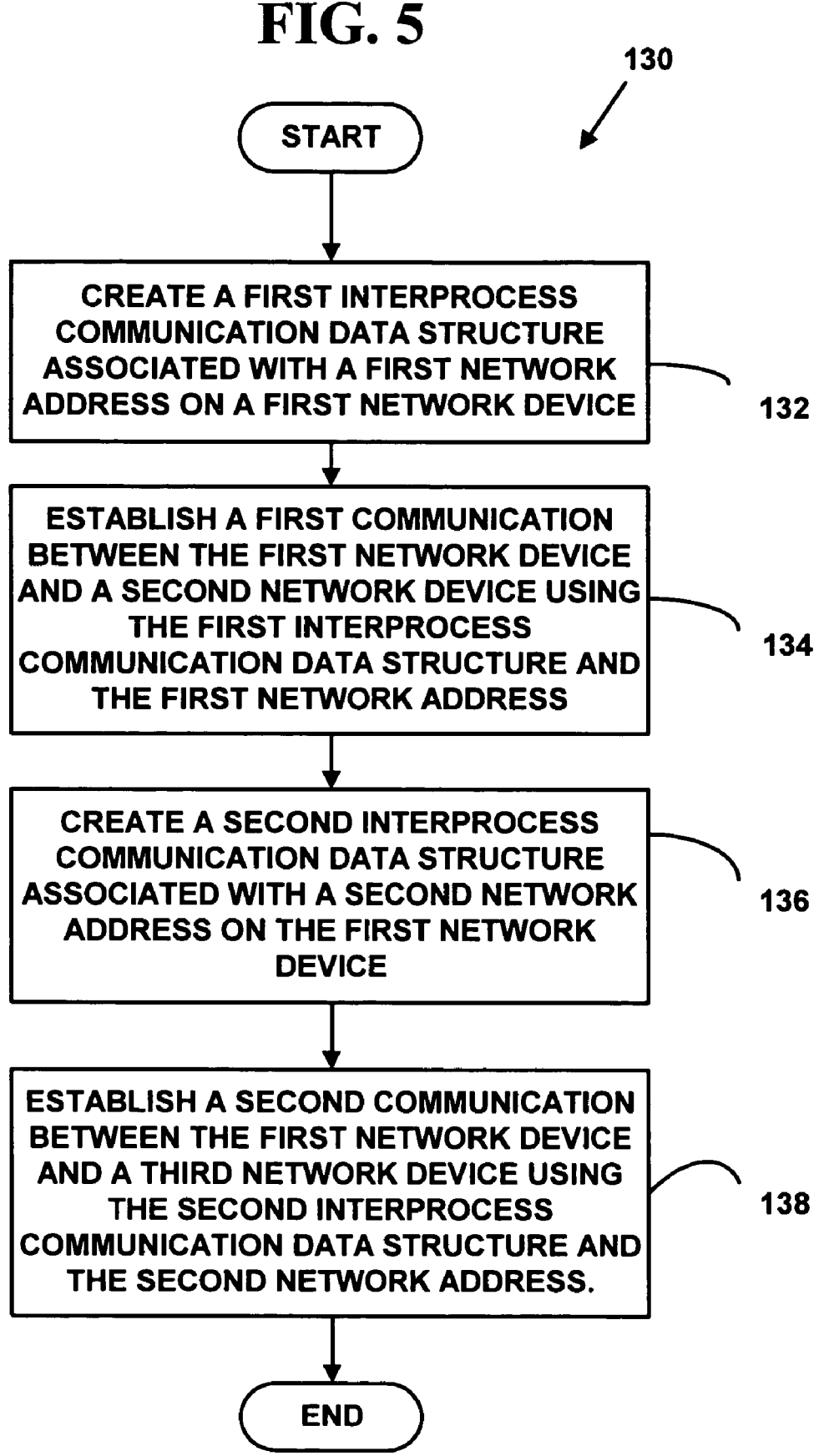

METHOD AND APPLICATION PROGRAMMING INTERFACE FOR ASSIGNING MULTIPLE NETWORK ADDRESSES

FIELD OF INVENTION

The present invention relates to communications in data networks. More specifically, it relates to a method and an application programming interface for assigning multiple network addresses.

BACKGROUND OF THE INVENTION

The Internet Protocol ("IP") and Transmission Control Protocol ("TCP") are rapidly becoming the lingua franca of modern data networks. Currently, host protocol stacks allow a single host to support multiple physical and logical data-link interfaces.

These interfaces may be either software or a combination of hardware and software. A data-link interface is typically a device that permits a host to communicate with another entity. Data-link interfaces may be active for as long as the host is running, or they may activate and de-activate dynamically. An example of a data-link interface is an Ethernet interface which consists of the Ethernet card along with a device driver. Typically the Ethernet interface becomes active upon system boot and remains active until the host computer is shut off.

Data-link interfaces typically represent an IP address that is bound to a data-link device. Communication via these interfaces occurs through device-independent calls to a socket application programming interface ("API"). As is known in the art, a socket is an endpoint, in a host computer's protocol stack, for communicating over a data network. The socket API provides the capability for application programs and their processes to access communications protocols automatically. The socket API exists logically above a transport layer for the TCP/IP stack, but below an application layer. The socket API, which is well known to those skilled in the art, is discussed in UNIX on-line manuals as well as many textbooks.

At present, all processes typically bind to one common IP address. When a process initiates an IP communication, the protocol stack binds the common IP address to the process. In this sense, all processes typically communicate over the same IP interface. Data traffic to or from one application is typically distinguished from data traffic to or from another application by a transport-layer parameter such as a TCP or User Datagram Protocol ("UDP") port. For some processes, however, having one common IP address may be restrictive.

Currently, protocol stacks may support multiple IP interfaces in a limited sense. A host with more than one physical interface may require more than one IP address. For example, a host computer may communicate using IP packets over a Point-to-point Protocol ("PPP") connection via a modem while simultaneously communicating using IP packets over an Ethernet connection. In this case, the Ethernet interface and the PPP interface would be associated with separate IP addresses. The processes on the host computer, however, have these separate IP addresses in common. Any process that communicates over the modem does so using the common IP address for the PPP connection. Similarly, any process that communicates over the Ethernet connection does so using the common IP address for the Ethernet connection.

Future communication systems, however, may require that a protocol stack is capable of supporting multiple IP addresses in a broader sense: different processes on the same host are associated with different IP addresses on the same physical interface. Processes may request a new IP interface with a new IP address rather than share a single IP address with all other processes. Instead of distinguishing traffic to and from processes by port numbers, the traffic may be distinguished by IP address.

It is therefore desirable to provide a method for binding multiple IP addresses to the same process. Multiple processes on the same host may then be assigned different IP addresses that are distinguishable at an application layer.

SUMMARY OF THE INVENTION

In accordance with preferred embodiments of the present invention, methods for assigning multiple network addresses are provided. One aspect of the invention includes a method for using multiple network addresses for interprocess communication through a common physical layer. The method includes creating a first interprocess communication data structure associated with a first network address on a first network device. A first communication is established between the first network device and a second network device using the first interprocess communication data structure and the first network address. The first communication passes through the common physical layer for the first network device. A second interprocess communication data structure associated with a second network address is created on the first network device. The second network address is different from the first network address. A second communication is created between the first network device and a third network device using the second interprocess communication data structure and the second network address. The second communication also passes through the common physical layer for the first network device.

The method may help overcome limitations in having one network address common to every process on the host computer. With this method, each process may create its own interprocess communication data structure for communicating over a data network. In turn, each interprocess communication data structure may be associated with its own network address.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a protocol stack for a network device;

FIG. 3 is a block diagram illustrating a typical stack implementation;

FIG. 4 is a block diagram illustrating a stack implementation with multiple network addresses; and FIG. 5 is a flow diagram illustrating a method for using multiple network addresses.

DETAILED DESCRIPTION OF PREFERRED EMBODIMENTS

Figure 1:
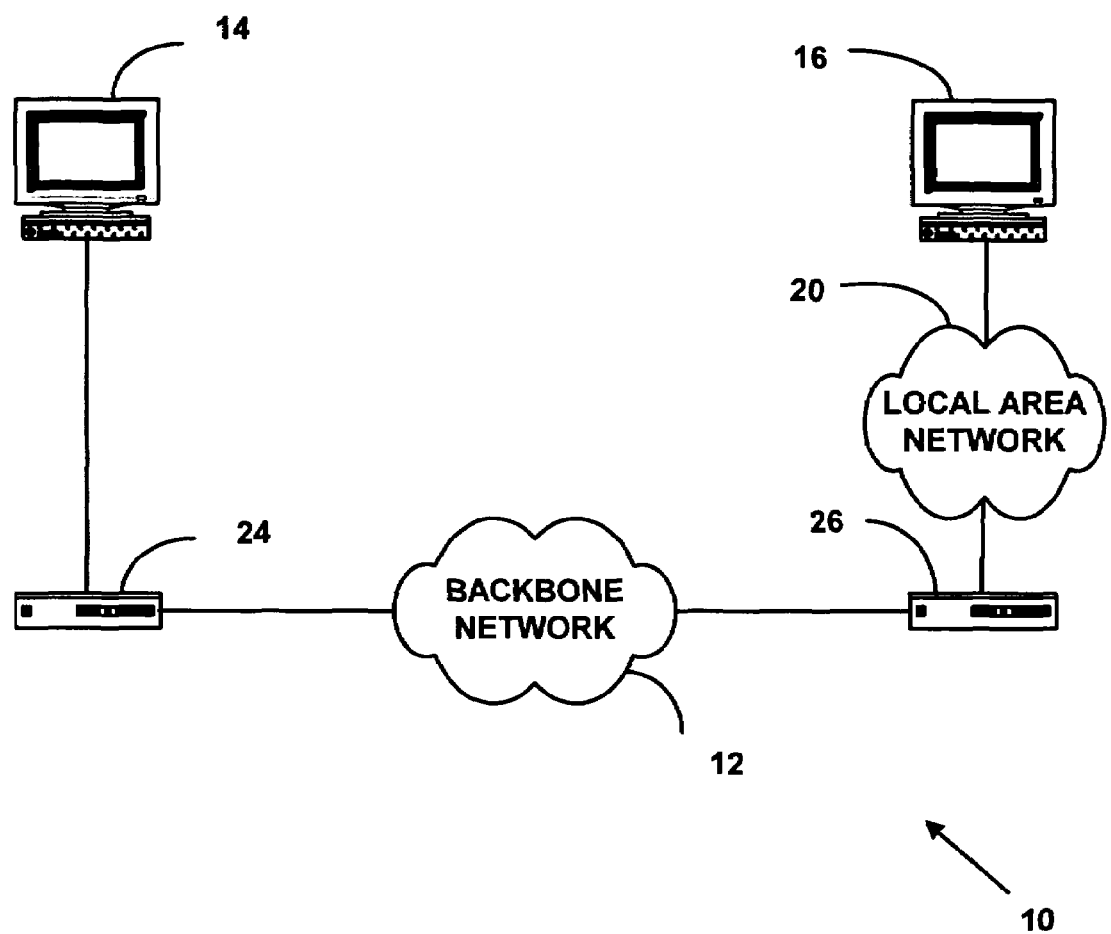
FIG. 1 is a block diagram illustrating a network system.

FIG. 1 is a block diagram illustrating an exemplary data network 10 for an illustrative embodiment of the present invention. The data network 10 includes a backbone network 12 (e.g. the Internet), a first network device 14, and a second network device 16. The backbone network 12 may be public in the sense that it may be accessible by many users who may monitor communications on it. Additionally, although only one is illustrated, there may be multiple local area networks ("LANs") 20 coupled to the backbone network 12. Data packets may be transferred to/from the first network device 14 and the second network device 16 over the backbone network 12. For example, the devices may be assigned public network addresses on the Internet. A data channel between the first network device 14 and the second network device 16 may include routers or gateways (24, 26). However, other data network types and network devices can also be used and the present invention is not limited to the data network and network devices described for an illustrative embodiment.

For example, the routers (24, 26) may be edge routers. An edge router routes data packets between one or more networks such as a public network (e.g. backbone network 12) and a private network (e.g. LAN 20). Edge routers are commercially available from numerous sources, including those provided by 3Com Corporation of Santa Clara, Calif., Cisco Systems of San Jose, Calif., Lucent Technologies of Murray Hill, N.J., Lucent subsidiaries including Livingston Enterprises, Inc. of Pleasanton, Calif., and Ascend Communications of Alameda, Calif., and others.

In one exemplary preferred embodiment of the present invention, the first 14 and second 16 network devices are telephony devices or bulk data devices. Bulk data devices include Web-TV sets and decoders, interactive video-game players, or personal computers running multimedia applications. Telephony devices include Voice over Internet Protocol ("VoIP") devices (portable or stationary) or personal computers running facsimile or audio applications. However, the ends of the data flow may be other types of network devices and the present invention is not restricted to telephony or bulk data devices.

Network devices and routers for preferred embodiments of the present invention include network devices that can interact with network system 10 based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol ("WAP") Forum. However, network devices based on other standards may also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org." Such standards, and the organizations that establish them, are well known to those skilled in the art.

It will be appreciated that the configuration and devices of FIG. 1 are for illustrative purposes only and the present invention is not restricted to network devices such as edge routers, and telephony or bulk data devices. As will be recognized by those skilled in the art, many other network devices are possible. Moreover, the configuration of data network 10 is not restricted to one backbone network 12 and one LAN 20 as shown in FIG. 1. Many different configurations of the data network 10 with multiple data networks and/or multiple local area networks at various positions in the data network configuration 10 are possible.

An operating environment for network devices of the present invention includes a processing system with at least one high speed Central Processing Unit ("CPU") and a memory. In accordance with the practices of persons skilled in the art of computer programming, the preferred embodiments are described below with reference to acts and symbolic representations of operations or instructions that are performed by the processing system, unless indicated otherwise. Such acts and operations or instructions are referred to as being "computer-executed," "CPU executed," or "executable."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Network Device Protocol Stack

FIG. 2 is a block diagram illustrating a protocol stack 50 for network devices, such as devices 14 and 16 in FIG. 1, in data network 10. The protocol stack 50 is typically executable code and data structures associated with a kernel for an operating system of the network device (14,16). The code resides in memory locations associated with the kernel and directs a CPU or CPUs to format and exchange network communications properly. The data structures are portions of memory that are used by the protocol stack code to retain dynamic and static values, and are also accessible and controllable by the kernel.

As is known in the art, the Open System Interconnection ("OSI") model may describe computer networks. The OSI model consists of seven layers including from lowest-to-highest, a physical, data-link, network, transport, session, presentation, and application layer. The physical layer exchanges bits over a communication link. The data link layer exchanges error free frames of data. The network layer exchanges and routes data packets.

The lowest layer of the protocol stack is the physical layer. The physical layer includes the physical media interfaces 52 that place signals on transmission media such as wires, coaxial cable, optical fiber, or transmit them as electromagnetic waves. The physical media interfaces 52 also read signals from the transmission media and present them to the data-link layer.

In the data-link layer is a Medium Access Control ("MAC") layer 54. As is known in the art, the MAC layer 54 controls access to a transmission medium via the physical layer. For more information on the MAC layer protocol 54 see IEEE 802.3 for Ethernet and IEEE 802.14 for cable modems. However, other MAC layer protocols 54 could also be used and the present invention is not limited to IEEE 802.3 or IEEE 802.14.

Above the data-link layer is an Internet Protocol ("IP") layer 58. The IP layer 58, hereinafter IP 58, roughly corresponds to OSI layer 3, the network layer, but is typically not defined as part of the OSI model. As is known in the art, the IP 58 is a message addressing and delivery protocol designed to route traffic within a network or between networks. For more information on the IP 58 see IETF RFC-791, the contents of which are incorporated herein by reference.

The Internet Control Message Protocol ("ICMP") layer 56 is used for network management. The main functions of the ICMP layer 56, hereinafter ICMP 56, include error reporting, reachability testing (e.g., "pinging") congestion control, route-change notification, performance, subnet addressing and others. Since the IP 58 is an unacknowledged protocol, datagrams may be discarded and the ICMP 56 is used for error reporting. For more information on the ICMP 56 see IETF RFC-792, the contents of which are incorporated herein by reference.

Above the IP 58 and the ICMP 56 is a transport layer with a User Datagram Protocol layer 60 ("UDP"). The UDP layer 60, hereinafter UDP 60, roughly corresponds to OSI layer 4, the transport layer, but is typically not defined as part of the OSI model. As is known in the art, the UDP 60 provides a connectionless mode of communications with datagrams. For more information on the UDP 60 see IETF RFC-768, the contents of which are incorporated herein by reference. The transport layer may also include a connection-oriented Transmission Control Protocol ("TCP") layer 62. For more information on TCP see IETF RFC-793 and IETF RFC-1323, the contents of which are incorporated herein by reference.

Above the transport layer is an application layer where the application programs that carry out desired functionality for a network device reside. For example, the application programs for the network device 16 may include a printer application program, while application programs for the network device 14 may include a facsimile application program.

In the application layer are typically a Dynamic Host Configuration Protocol ("DHCP") layer 66 and a File Transfer Protocol ("FTP") layer 68. The DHCP layer 66 is a protocol for passing configuration information to and from hosts on an IP 58 network. For more information on the DHCP layer 66 see IETF RFC-2131, the contents of which are incorporated herein by reference. The FTP layer 68 is a file transfer protocol used to download files and configuration information. For more information on the FTP layer 68 see IETF RFC-959, the contents of which are incorporated herein by reference. Processes also reside in the application layer. While FIG. 2 identifies a five layer OSI model, those skilled in the art will recognize that more or fewer protocol layers may be used in the protocol stack 50.

Network Address Interfaces

FIG. 3 is a block diagram illustrating a typical stack implementation 80. The diagram depicts a typical TCP/IP or UDP/IP stack implementation in many operating systems. One or more processes 82–86 may each connect to one or more sockets 88–92. As is known to those skilled in the art, an application is a program that performs a useful task. An application may include many processes, each of which is a set of instructions for directing a CPU to perform a specific task.

Additionally, each process 82–86 may connect to one or more sockets 88–92 and each socket 88–92 may connect to one or more processes 82–86. In general, a process may connect to more than one socket. Also, the processes within an application may simultaneously be associated with the same socket. For example: Process A 82 is connected to Socket #2 90; Process B 84 is connected to both Socket #1 88 and Socket #2 90; and Process C 86 is connected to Socket #2 90 and Socket #3 92.

Each socket includes a source IP 58 address as well as a source TCP 62 or UDP 60 port. Typically, each of the source IP 58 addresses in the sockets 88–92 are actually pointers to a host's single IP 58 address for its network address interface 94, which in turn is bound to a data-link interface 96. The IP 58 address typically resides in memory associated with a kernel of an operating system for the host network device. All Sockets 88–92 share the same IP 58 address ID and data-link layer, and communicate over the same physical medium.

As will be further described below, a function call may specify the IP 58 address for the socket, provided that this IP 58 address is a valid IP 58 address for the network address interface 94. More generally, however, the function call does not specify the IP 58 address. Instead, it allows the kernel of the operating system for the host network device to choose the (known) IP 58 address for the network address interface 94. Also, by calling the socket creation and binding functions, the process may specify a TCP 62 or UDP 60 port number (especially if the application uses a well-known port number as is familiar to those skilled in the art). Alternatively, the process may leave the choice of port up to the kernel of the operating system (the latter being referred to as an "ephemeral" port in the art).

An API for the sockets 88–92 includes reentrant functions for creating sockets and binding them to interfaces. As is known to those skilled in the art, a function is a self-contained set of instructions for carrying out a particular task. When a process calls a reentrant function, the kernel of the operating system for the network device directs the CPU to execute the code of the function. After executing the code of the function, the kernel instructs the CPU to reenter the calling process, to return a result at the point where the calling process called the function, and to continue executing the code of the calling process. For more information on socket functions, see "The Design of the Unix Operating System", by Maurice J. Bach, Prentice-Hall, 1990, the contents of which are incorporated herein by reference. Generally, processes running on the host network device call the reentrant functions for the socket API.

In operation, a first process on a first network device 14, e.g. Process B 84 of FIG. 3, exchanges data with a second process (not shown) on a second network device 16 through an interprocess communication. An example of an interprocess communication is a socket-to-socket virtual data link. Data from the first process transfers to an appropriate interprocess communication data structure, e.g. Socket #1 88. The interprocess communication data structure is a portion of memory in the first network device 14 that is associated with the protocol stack 50 for the first network device 14. When the first process places data in this data structure, the kernel of the operating system for the first network device 14 encapsulates the data and transmits it as a packet to the second network device 16. Once the packet reaches the second network device 16, the kernel of the second network device 16 extracts the data and places it in another interprocess communication data structure. The other interprocess communication data structure is associated with the second process, e.g. a socket at the other end of the interprocess communication. The second process may access the other data structure to receive the data from the first process. The operating system creates and configures interprocess communications data structures through calls to an API.

API for a Single Network Address

A call to a reentrant function called "socket" creates a socket by setting up a data structure in the host computer's memory. A "socket" call may take the following form:

$$\text{sd=socket (format, type, protocol)} \qquad (1)$$

The socket descriptor, "sd", is typically a handle that is used by the calling process to identify this particular socket. As is known in the art, a handle is code that includes access control information and/or a pointer to an object. For example, the socket descriptor appears in "read" and "write" statements and designates the input stream from which the host reads data or the output stream to which the host writes data.

The value of the "format" argument may indicate the address format of a communications domain. For example, as is known in the art, a value of AF_INET, a designator of the IP 58 address family, may indicate that the socket is to be used to communicate between network devices over an IP 58 connection. Additionally, the value of AF_INET indicates that the network devices have thirty-two bit addresses (i.e., corresponding to familiar IP 58 address dotted decimal notation w.x.y.z). Similarly, a value of AF_INET6 may indicate that communication is over IP version 6, which requires one-hundred twenty-eight bit addressing.

The values of the "type" and "protocol" arguments may indicate whether communication over the socket is connectionless or connection oriented. For example, as is known in the art, a value of SOCK_STREAM for the "type" argument may indicate that communication is a connection oriented virtual circuit by means of TCP 62. Similarly, a value of SOCK_DGRAM for the "type" argument may indicate that communication is connectionless via datagrams by means of UDP 60. As is known to those skilled in the art, the "protocol" argument may indicate a particular protocol to control the communication.

Once the kernel of the operating system creates the data structure for the socket, the socket may be bound to the network layer interface and assigned a network address and/or a port number. The "bind" reentrant function typically performs this task for servers and UDP 60 clients. A "bind" function call associates a name with the socket descriptor and is illustrated below:

$$\text{bind (sd, host address, length)} \qquad (2)$$

The socket descriptor, "sd," is the value that was returned by the "socket" call referenced above (1) when the socket data structure was created. The "host address" argument is typically a pointer to a data structure stored in the kernel of the operating system for the host. The data structure typically designates an address family, e.g. AF_INET, an address for the host, and a port number for the host. The value of the "length" argument is typically the size of the data structure referenced by the "host address" argument. For example, if the host network device is a server, the "host address" data structure may specify an IP 58 address and a port address provided these are valid addresses for the network address interface 94. Alternatively, the "host address" data structure may specify a well-known port number but not specify an associated IP 58 address. In this case, the kernel of the server would automatically bind the socket to the existing IP 58 address 94 of the network layer interface. Once server processes have bound addresses to sockets, they may announce the socket names to client processes, such as processes 82–86.

Alternatively, if the host network device is configured as a TCP 62 or UDP 60 client, both the values of the host IP 58 address and port number may remain unspecified. In this case, the kernel of the client may automatically bind the socket to the existing IP 58 address of the network address interface 94 and to an ephemeral port of a transport layer interface.

Instead of using the "bind" function, however, a TCP 62 or UDP 60 client may also bind a socket using a "connect" reentrant function. The "connect" reentrant function associates the local client's socket with a target socket on the server. A "connect" call associates a target address with a local socket descriptor as illustrated below:

$$\text{connect (sd, target address, length)} \qquad (3)$$

The socket descriptor, "sd," is the value that was returned when the client's socket data structure was created by a call to a "socket" function. The "target address" argument is typically a pointer to another data structure stored in the host client. This "target address" data structure typically designates an IP 58 address for the server to which the client is connecting, and a port number for the target socket on the server. The value of the "length" argument is typically the size of the data structure referenced by the "host address" argument. The "connect" function call typically refers to the address structure for the server's socket, not the client's socket, and leaves the assignment of the host IP 58 address and port number for the client's socket to client's kernel.

Once a socket has been created with a "socket" function call and bound with a "bind" or "connect" function call, a process may determine a local network address and port number by a call to a "getsockname" reentrant function. A "getsockname" function call associates an address structure with the socket descriptor and is illustrated below:

$$\text{getsockname (sd, address, length)} \qquad (4)$$

The socket descriptor, "sd," is the value that was returned when the socket data structure was created by a call to a "socket" function. This descriptor refers to the socket whose address we wish to determine. The "address" argument is typically a pointer to a data structure stored in the kernel of the operating system for the host. The kernel fills the "address" data structure with the IP 58 address and port number that the socket is currently using. The value of the "length" argument is typically the size of the data structure referenced by the "address" argument. The "getsockname" function is useful whenever other processes 82–86 need to know the actual values for the IP 58 address of the network address interface 94 and the port number of the transport interface. For example, when a server creates and binds a socket it may need to advertise the address of this socket to client network devices. A process on the server may get the socket's address and port number and pass this information on to the client. In this manner, the clients would have access to a target address for connecting to the server's socket.

When network communications no longer need a socket, a process typically de-allocates the socket by a "close"

reentrant function. A "close" function call releases a connection for data communications over the network. Previous "connect" or "bind" function calls may have established the connection. The "close" function call is illustrated below:

$$\text{close (sd)} \tag{5}$$

Both the socket descriptor and port number associated with the socket disappear from the protocol stack 50. The port number of the transport interface typically returns to a pool of port numbers. The network address for the network layer interface 94, however, does not necessarily disappear from the protocol stack 50 because it may be bound to a data-link interface.

Multiple Network Address Interfaces

In the above description of the socket API, there was only one available network address interface 94 as depicted in FIG. 3. In new and emerging communication systems, such as those accomplishing Network Address Translation ("NAT") or Voice-over-IP ("VoIP"), different processes on the same host may be required to have different IP 58 addresses. NAT is described in IETF RFC 1631 and IETF RFC 2663, the contents of which are incorporated herein by reference. VoIP is described in ITU Recommendation H.323, the contents of which are incorporated herein by reference. As is known in the art, Recommendation H.323 defines negotiation and adaptation layers for video and audio over packet switched networks that do not offer guaranteed service or Quality of Service ("QoS").

FIG. 4 is a block diagram illustrating a stack implementation 100 with multiple network addresses. As is illustrated in FIG. 4, each socket in a multiple network address interface may use a different IP 58 address, as illustrated by IP 58 addresses X, Y, and Z. Additionally, all IP 58 addresses may be bound to the same data-link interface 96. For example, Socket #1 108 is bound to IP 58 address @X 114, Socket #2 110 is bound to IP 58 address @X 116, and Socket #3 112 is bound to IP 58 address @X 118. All the IP 58 interfaces 114–118 are bound to the same data-link interface 96. However, the present invention is not limited to the network and data-link interfaces as illustrated in FIG. 4 and other multiple address interfaces may alternatively be used.

In order to support multiple network addresses, as illustrated in FIG. 4, a host protocol stack 50 may require modification to support multiple IP 58 addresses in a single network layer.

Furthermore, the protocol stack 50 may require modification to receive multiple IP 58 addresses dynamically, through a mechanism such as DHCP 66. Alternatively, assignment of the multiple network addresses may occur by selecting them from a pool of static IP 58 addresses. Additionally, when an application requests a new network address, the protocol stack 50 may request the network address from a network address server, receive the network address assignment from the server, and associate that network address with the socket. It should be understood that the present invention is not limited to these configurations for supporting multiple network addresses and that many more configurations are possible but the foregoing is preferred.

In accordance with a preferred embodiment, a new socket API may be constructed that directs the kernel of the operating system to establish and use multiple network addresses in the protocol stack 50. The new socket API behaves differently compared to the old socket API described above; namely, that the new API permits multiple network addresses whereas the old API only permits a single network address.

Although the corresponding functions in the new API are different in execution and produce different results from those of the old API, they may be conceptually analogous to the old socket API functions. A programming convention, known to those skilled in the art, is to name new socket functions after analogous old socket functions. The naming convention is a mnemonic device used by programmers for purposes of replacing old versions of functions with new versions. As described below, the new API may contain a modified "socket" system call to request that a particular socket allocate a new IP 58 address. Additionally, as further described below, the new API may contain modified "bind," "connect," "getsockname," and "close" functions.

Modified Socket Function

A modified "socket" reentrant function that accommodates multiple network addresses may be defined in a variety of ways. In one exemplary preferred embodiment of the modified "socket" function, the modified "socket" function includes an argument to direct the kernel to assign a new network address to a newly created socket. For example, the function call may take the form:

$$\text{sd=socket (format, type, protocol, tuple)} \tag{6}$$

where the value of the extra "tuple" argument may indicate to the kernel that this socket is to be assigned a new network address from a pool of available addresses (i.e. a static assignment) or dynamically through some mechanism such as DHCP 66. A default value for "tuple" may indicate that the socket is to be assigned a common network address by the protocol stack 50 in a manner similar to the single address "socket" call referenced above (1).

Another exemplary preferred embodiment uses a new address family for the "format" argument of the socket function call to indicate that the kernel assigns a new network address to the socket. For example, the modified "socket" function call may retain the form of Equation 1. However, a value such as AF_INET_TUPLE for the "format" argument may indicate to the kernel that it should assign a new IP 58 address to this socket. It should be understood that the present invention is not limited to these exemplary embodiments. Although not currently known but within the capabilities of one skilled in the art, other ways of creating a modified socket with a new network address are possible.

Modified Bind Function

The new socket API may include a modified "bind" reentrant function that accommodates multiple network addresses. A socket that is created by the above-described modified "socket" function call, and has asked for a new network address, will be bound to the new network address by a call to the modified "bind" function. The form of the modified "bind" function may be analogous to the old "bind" function referenced above (2).

The modified "socket" function call has already indicated to the kernel that a new network address is associated with the socket descriptor. The modified "bind" function call passes the socket descriptor, "sd," to the kernel of the operating system for use in the protocol stack 50. The kernel recognizes this value for socket descriptor as associated with a new network address by a previous modified "socket" function call. As before, for the single network address interface, the calling process may specify a well-known port number as a parameter of the bind function call. Alternatively, the process may leave the port number unassigned, in which case the kernel may fill in an ephemeral port number as happened in the old "bind" function. The IP 58 address argument may typically be left unassigned in the "bind" function call.

The kernel of the operating system examines the memory associated with the protocol stack 50 and fills in the new IP 58 address that is associated with the socket descriptor, "sd." In one exemplary preferred embodiment, the kernel selects the IP 58 address from a pool of reserved addresses (i.e. static assignment). Alternatively, the kernel requests the address dynamically from an address server when the "socket" function call creates the socket. The IP 58 address may be stored in a table in memory associated with the protocol stack 50 section of the kernel, along with the socket descriptor. When a process later makes a modified "bind" function call with the socket descriptor, the kernel searches for this socket descriptor. The kernel determines the previously reserved IP 58 address from the table, and returns this address in the IP 58 address structure of the modified "bind" function.

In another exemplary preferred embodiment, the kernel does not select the IP 58 address until a process calls the modified "bind" function. The call to the modified "socket" function records that the returned socket descriptor, sd, is slated to be assigned a new IP 58 address. The kernel, however, does not yet assign the network address. When the process makes the modified "bind" function call, the kernel determines that the socket descriptor argument contains a socket descriptor that was slated for a new IP 58 address. The kernel selects an IP 58 address for the socket from a pool of addresses or dynamically as described above. The kernel also associates the socket descriptor with the IP 58 address, e.g. in a table, and passes the new IP 58 address up to the IP 58 address structure in the modified "bind" function. It should be understood that the present invention is not limited to these exemplary embodiments and that many other ways of binding a modified socket with a new network address are possible.

Modified Connect Function

The "connect" reentrant function also requires modification to accommodate multiple network addresses. As described above, both TCP 62 and UDP 60 clients use a "connect" function call to allocate an IP 58 address and an ephemeral port. The modified "connect" function may retain the form of the old "connect" function call referenced above (3). The target IP 58 address and port number (the address of the server associated with the client) are passed as arguments to the modified "connect" function as before.

The modified "connect" function call passes the socket descriptor, "sd," to the kernel. The kernel recognizes this value for the socket descriptor as being associated with a new network address by a previous modified "socket" function call. As before, for the single network address interface 94, the calling process may allow the kernel to bind an ephemeral port number to the socket.

When a process makes a "connect" function call, the kernel also binds the socket to the new IP 58 address that is associated with the socket descriptor, "sd." In one exemplary preferred embodiment, the kernel selects the IP 58 address from a pool of reserved addresses (i.e. a static assignment). Alternatively, the process may request the address dynamically from an address server (not shown in FIG. 4) when the "socket" function call creates the socket. The IP 58 address may be stored in a table in memory associated with the protocol stack 50 section of the kernel, along with the socket descriptor. A later modified "connect" function call with the socket descriptor causes the kernel to search for this socket descriptor and determine the previously reserved IP 58 address from the table. In this manner, a connection is established between the client socket, having the new IP 58 address and port number, and the server socket, having the target IP 58 address and port number.

In another exemplary preferred embodiment, the kernel does not assign an IP 58 address until the call is made to the modified "connect" function. The call to the modified "socket" function records that the returned socket descriptor, sd, is slated to be assigned a new IP 58 address. The kernel, however, does not yet assign the network address. When a process makes the modified "connect" function call, the kernel determines that the socket descriptor argument contains a socket descriptor that slated for a new IP 58 address. The kernel may select an IP 58 address for the socket from a pool of addresses or, alternatively, the IP 58 address may be assigned dynamically such as is described above. The kernel also associates the socket descriptor with the IP 58 address, e.g. in a table. In this manner, a connection is established between the client socket, having the new IP 58 address and port number, and the server socket, having the target IP 58 address and port number. It should be understood that the present invention is not limited to these exemplary embodiments and that many other ways of connecting a modified socket with a new network address are possible.

Modified getsockname Function

The "getsockname" reentrant function also requires modification to accommodate multiple network addresses. The modified "getsockname" function may retain the form of the old "getsockname" function as referenced above (4). Although the modified "getsockname" function has the same name as the old "getsockname" function, its operation is different. A process calls the modified "getsockname" function and passes the value of the socket descriptor to the kernel. The kernel determines whether the socket descriptor is associated with a new IP 58 address. If the socket descriptor is associated with a new IP 58 address, the kernel fills in the referenced address structure with the new IP 58 address and port number. In this manner, the modified "getsockname" function returns the new network address assigned to the socket in an address data structure. The new network address may have been associated with the socket descriptor during a previous modified "socket" function call, a previous modified "bind" function call, or a previous modified "connect" function call.

Modified Close Function

The "close" reentrant function is preferably also modified to accommodate multiple network addresses. The modified "close" function may retain the form of the old "close" function as referenced above (5). A process calls the "close" function and passes the value of the socket descriptor to the kernel. The kernel determines whether this socket descriptor is associated with a new IP 58 address. The new network address may have been associated with the socket descriptor during a previous modified "socket" function call, a previous modified "bind" function call, or a previous modified "connect" function call. If the socket descriptor is associated with the new IP 58 address, the kernel also de-allocates this new IP 58 address and port number. The kernel accomplishes this, for example, by deleting the socket descriptor and/or the new network address from a table in the protocol stack 50 section of the kernel. In this manner, the modified "close" function releases the data communications connection, and the network and virtual interface both disappear. Alternatively, if the kernel assigned the network address to the socket through a dynamic process such as DHCP 66, the socket may automatically close at the end of a lease time by methods known to those skilled in the art.

Method for Using Multiple Network Addresses

FIG. 5 is a flow diagram illustrating a method 130 for using multiple network addresses for interprocess communication through a common physical layer. The method 130 includes creating a first interprocess communication data structure associated with a first network address on a first network device 14 at step 132. The first network device 14 may be the telephony device as illustrated in FIG. 1, although other types of network devices are possible and the present invention is not limited to the telephony device of FIG. 1. An example of an interprocess communication data structure associated with a network address is a socket that is assigned a new IP 58 address when it is created, as described above. A call to a "socket" function from a process may create the first socket as a data structure in memory associated with the kernel of the first network device 14. For example Socket #1 108 of FIG. 4 may be created by a modified "socket" function call from Process B 84. However, it should be understood that the present invention is not limited to sockets and IP 58 addresses, and that other types of interprocess communication data structures and network addresses may be used.

At step 134, a first communication is established between the first network device 14 and a second network device 16 using the first interprocess communication data structure and the first network address. For example, the first socket may establish a connection with a target socket on the second network device 16. This may initiate a data flow between the process bound to the first socket and another process on the second network device 16 bound to the target socket. The communication may be connection oriented, such as a TCP 62 virtual connection, or connectionless, such as a UDP 60 virtual connection. The data flow may follow a modified "bind" or "connect" function call with the "socket descriptor" for the first socket. Process B 84, for example, may initiate a data flow through the data structure of Socket #1 108. The kernel associated Socket #1 108 with its own network interface 114 having the new IP 58 address @X. However, it should be understood that the present invention is not limited to TCP/IP communications or the like and that other forms of communications are possible, such as UDP/IP or X.25 communications familiar to those skilled in the art.

The first communication passes through the common physical layer for the first network device 14. As illustrated in FIG. 4, the multiple IP 58 addresses at the network layer share a common data-link and device driver 96 for the first network device 14 at its physical layer. Data flows to and from all processes 82–86 through the same physical layer interface 96. Data to or from one process 82–86 may go to one or more socket data structures 108–112. The respective network layer interface 114 for the first socket 108 encapsulates or decapsulates the data and processes the packets through the common data-link and physical layer 96.

A second interprocess communication data structure is created at step 136. The second interprocess communication data structure is associated with a second network address on the first network device. The second network address is different from the first network address. For example, Process B 84, having already created Socket #1 108, may also create a second socket, Socket #2 110, by another modified "socket" function call. Socket #2 110 has a different IP 58 address, @Y, compared to Socket #1 108, @X, as the kernel assigns a new IP 58 address when the process makes a modified "socket" function call. There are now two sockets on the first network device 14, and each socket is associated with a different IP 58 address.

At step 138, a second communication is established between the first network device 14 and a third network device (not shown) using the second interprocess communication data structure and the second network address. The second socket may then establish a connection with another target socket on a third computer to provide another virtual connection. This may initiate a data flow between the process and a third process on the third network device bound to the target socket. The communication may be connection oriented, such as a TCP 62 virtual connection, or connectionless, such as a UDP 60 virtual connection. The data flow may follow a modified "bind" or "connect" function call with the "socket descriptor" for the second socket. Process B 84, for example, may initiate a data flow through the data structure of Socket #2 110. The kernel associated Socket #2 110 with its own network interface 116 having the new IP 58 address @Y. The respective network layer interface 116 for the second socket 110 encapsulates or decapsulates the data and processes the packets through the common data-link and physical layer 96. In this manner, a host computer, application, process, or other entity may support multiple network addresses and bind each address to a separate socket and/or a separate process. This allows a network device to communicate with other network devices using two or more network addresses.

In the present invention, more than one IP 58 interface may map to the same physical or logical data-link device. However, each interface will only send and receive data on behalf of a related group of processes as illustrated in FIG. 4. An advantage of the present invention compared to a traditional data-link interface is that it represents an IP 58 address that is bound to a given executing instance of an application (e.g., a process or related group of processes). Such a configuration may be useful for differentiating IP 58 data traffic to or from a particular host based on something other than a transport-layer parameter such as a TCP 62 or UDP 60 port.

For example, in Internet telephony it may be advantageous for each new call to be ascribed a new IP 58 address. Calls are typically IP 58 messages exchanged between telephony devices in a virtual private network. The telephony devices may typically support multiple calls, each call being associated with a process in the telephony device. In this case, the new IP 58 address resides in a private network address space for the virtual private network. NAT tunnels the calls across the (public) Internet. Ascribing a new and unique IP 58 address to each call may ensure that the identity of the caller is hidden as the call traverses the Internet. Each call process should be associated with a respective private IP 58 address. The present invention may assign a new IP 58 address to each new call in the manner described above.

Another advantage of supporting multiple IP 58 addresses is improving switching efficiency. As described above, IP 58 addresses rather than TCP 62 or UDP 60 port number may distinguish traffic for applications. In general, layer 3 (network layer) switching using IP 58 addresses is expected to be more efficient than layer 4 (transport layer) switching using TCP 62 or UDP 60 ports. Improved switching efficiency may increase the call capacity of the Internet.

Yet another advantage of using multiple IP 58 addresses is to differentiate data traffic associated with different Quality of Service ("QoS"). QoS provides statistical guarantees of throughput, delay, delay variation, and packet loss. QoS is important in the transmission of Internet telephony, multimedia, and video data streams as these transmissions require a guaranteed bandwidth to function. Different applications on the same host computer may need to communicate with a separate QoS. For example, Internet telephony applications may require a constant or guaranteed bitrate QoS, whereas a web browsing application may require a basic QoS. Differentiating QoS may also improve the ability of the Internet to carry many forms of data communication simultaneously.

Edge routers (24,26) supporting QoS are required to process IP 58 packets differently depending on the QoS of the data communication. Instead of examining the internal details of an incoming IP 58 packet to determine the appropriate QoS, the edge router (24,26) may simply recognize that an IP 58 address in the header is associated with a particular QoS and process that packet accordingly. As discussed above, layer 3 switching is typically expected to be efficient. Ascribing an IP 58 address to each application may allow the IP 58 address for the application to be associated with the QoS of the application. The IP 58 address and QoS of the application may be conveyed to the edge router (24,26) to establish a layer 3 switching channel for the application. Therefore, each communication is over a virtual channel between applications associated with a particular QoS and a unique IP 58 address. It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all implementations that come within the scope and spirit of the following claims and equivalents thereto are claimed as the invention.

We claim:

1. A method for using multiple network addresses for interprocess communication through a common physical layer, said method comprising the steps of:

creating a first interprocess communication data structure associated with a first network address on a first network device;

establishing a first communication between the first network device and a second network device using the first interprocess communication data structure and the first network address, wherein the first communication passes through the common physical layer for the first network device;

creating a second interprocess communication data structure associated with a second network address on the first network device, wherein the second network address is different from the first network address; and establishing a second communication between the first network device and a third network device using the second interprocess communication data structure and the second network address, wherein the second communication passes through the common physical layer for the first network device.

2. A computer readable medium having stored therein instructions for causing a central processing unit to execute the method of claim 1.

3. The method of claim 1 wherein the first interprocess communication data structure is a first socket comprising:

a first socket descriptor with which a first process on the first network device accesses the first interprocess communication data structure; and the first network address.

4. The method of claim 1 wherein the second interprocess communication data structure is a second socket comprising:

a second socket descriptor with which a second process on the first network device accesses the second interprocess communication data structure; and the second network address.

5. The method of claim 1 wherein the first network address and the second network address are Internet Protocol addresses.

6. The method of claim 1 wherein the step of creating the first or second interprocess communication data structure includes calling a reentrant socket networking function that allows multiple network addresses to be allocated.

7. The method of claim 1 wherein the step of creating the first or second interprocess communication data structure includes calling a reentrant bind socket networking function that allows multiple network addresses to be allocated.

8. The method of claim 1 wherein the step of establishing the first or second communication includes calling a reentrant connect socket networking function that allows multiple network addresses to be allocated.

* * * * *